United States Patent Office 3,579,634
Patented May 18, 1971

3,579,634
NOVEL ANTACID COMPOSITIONS AND METHODS FOR THEIR ADMINISTRATION
Garland Richard Brown, 5522 W. Hamilton Road, Fort Wayne, Ind. 46809
No Drawing. Continuation-in-part of application Ser. No. 785,727, Dec. 20, 1968, which is a continuation-in-part of application Ser. No. 722,176, Apr. 18, 1968. This application Apr. 14, 1970, Ser. No. 28,297
Int. Cl. A61k 27/00
U.S. Cl. 424—154                                   33 Claims

ABSTRACT OF THE DISCLOSURE

The invention relates to a novel antacid containing as the essential ingredients an antacid and a water dispersible, colloidal anionic ether or ester derivative of a low polymer of a monosaccharide. The invention includes methods of preparation and administration of the novel antacid, as well as its formulation into liquid or solid, including compressed tablets, dosage forms.

BACKGROUND OF THE INVENTION

This application is a continuation-in-part of my copending application Ser. No. 785,727 filed Dec. 20, 1968, which is a continuation-in-part of my copending application Ser. 722,176 filed Apr. 18, 1968.

(1) Field of the invention

My invention relates to highly effective antacid compositions, their preparation and their use in the treatment of disorders of the gastro-intestinal tract.

(2) Description of the prior art

In the prior art, it has been shown that diseases which beneficially respond to antacid therapy do so in direct proportion to the amount ingested and to its duration of action within the stomach. Prior liquid antacids have heretofore required stabilization which has been achieved by the addition of viscosity increasing additives. In such systems there is a low limit of antacid concentrations attainable beyond which an undesirable thickened or paste consistency occurs. As a result, there is a high concentration of non-active ingredients in the suspension. Other means of suspension used in the prior art include formation of supersized flocs and chemical gel formation, all of which produce undesirable, unpalatable antacid compositions and greatly limit the antacid concentration attainable. Furthermore, because of the relatively high concentration of the non-active ingredients added to achieve stability of these suspensions of the prior art, there is interference of interaction between the active antacid and the gastro-intestinal secretions and/or diseased areas. This results in delayed on-set of action as well as preventing part of the ingested antacid from ever interacting with the gastric acid before being washed out of the stomach. This delayed on-set of action, caused by interference of interaction of the active antacid, also prevents direct action on the irritated, inflamed or ulcerated portions of the lower esophagus through which the products of the prior art rapidly pass without desirable active interactions. What beneficial effects that are attained in the lower esophagus by the prior art is only that of reduced gastric acidity which secondarily reduces the irritation to the lower esophagus produced by reflux of gastric contents into this anatomical area. In addition, the stability of these suspensions has been difficult to maintain during long shelf life. These products of the prior art have varying degrees of stability and shelf life wherein prolonged standing without agitation results in undue settling, caking and partial gelation, which require considerable effort and agitation to bring about thorough resuspension, if totally resuspendable at all. Also, should these products, because of a loose bottle cap, be allowed to dry out or partially dry out, addition of water will not bring about a resuspension of the ingredients without the use of techniques or equipment not commonly available to the pharmacist or patient user.

The prior liquid products, because of their low concentration of antacid ingredients, must be consumed in large volumes to be efficacious and furthermore, require frequently repeated dosages. In attempting to achieve prolongation of therapeutic action, the very viscous antacid products of the prior art have been combined with drugs to slow down the emptying rate of the stomach. However, these additional additive products have undesirable side effects. Many liquid products now commercially available have been described in advertising and clinical reports as possessing increased viscosity as a desirable characteristic to aid in prolonging antacid activity by increased adhesion and decreased flowability in the upper gastro-intestinal tract. However, when these products, although of increased viscosity when ingested, mix with the secretions of the stomach, there can only be a dilution effect of the thickening agents or breakdown of the chemical gel with resulting decreased viscosity of the suspension within the stomach, and thus, greater fluidity allowing more rapid emptying from the stomach. In addition these products are all of low range concentration of the active antacid ingredient and, therefore, are subject to the disadvantages previously described. The literature is full of studies directed to attempting to improve upon the problems of high volume, frequently repeated dosages in antacid therapy by means of the methods mentioned above and by constantly seeking different chemical active ingredient forms. All have failed appreciably to solve these major problems without undue side effects from additives used or by greatly reduced palatability and decreased patient acceptance.

The solid antacid products of the prior art have also failed to attain the desired efficaciousness as described above, because their physical form and chemical ingredients require that either they be swallowed in solid form or be dissolved in large volumes of orally generated saliva. Also, the relatively small amount of active antacid ingredient per tablet requires ingestion of many tablets and frequently repeated doses to achieve desirable therapeutic results. In any case, once these antacid ingredients enter the stomach they face the same disadvantages as described above for liquid antacid products. In addition, because of the gritty, dry and bland taste and unpalatable oral feel, these products also are met with a low level of patient acceptance.

SUMMARY OF THE INVENTION

I have now devised a novel, high active ingredient concentration antacid containing as the essential ingredients an antacid and a pharmaceutically acceptable gelation agent. By the term gelation agent I mean those substances which, when mixed with or added to the active antacid ingredient, are capable of changing the colloidal-physical characteristic of the active antacid ingredients, so that, when the so-treated or affected active antacid ingredients are mixed with relatively small quantities of aqueous systems and are plcaed in contact against or intermixed with gastro-intestinal mucous and secretions, or other secretions found in conjunction with ulcer or other disease entities of the gastro-intestinal tract, will result in a thickened, gel-like consistency of the active antacid compositions with tenacious adherence to the mucous, other secretions and gastro-intestinal linings. These agents have the capacity of fluidizing the active antacid ingredients of in vitro aqueous systems prior to gelation in the gastro-intestinal tract as described above and this action is an important part of the total colloidal physical mechanism that ultimately results in the desired change of consistency in the gastro-intestinal tract previously described. Suitable agents are water dispersible, colloidal salts of an anionic ether or ester derivative of a low polymer of a monosaccharide.

I have found that the products of my invention, in comparison with prior products, are capable of producing immediate on-set of action, attracting directly to diseased portions of the gastro-intestinal tract and tenaciously adhering to these areas for prolonged periods of time. In addition, my products are attracted to and tenaciously adhere to mucous covering the gastro-intestinal linings in general and particularly in areas where the acid is being formed, resulting in neutralization of the acid at its point of origin. Also, the products possess a marked prolongation of antacid activity, are of greater patient acceptance and are efficacious in smaller volume dosage forms and because of greater potency require a less frequent dosage regimen. The products can be produced in different forms such as liquids, suspensions or as a dry powder which is conveniently compressible into a tablet or other physical forms. Both the dry powder and the tablet most unexpectedly are immediately suspendable in heretofore unattainably small volumes of aqueous systems, including human saliva, and upon ingestion are capable of producing the identical advantageous clinical and pharmacological results described above. In addition, should liquid suspensions of my invention inadvertently dry out, either partially or totally, immediate resuspension to the original state is easily achieved by the mere addition of small amounts of water. There are no undue side effects secondary to ingestion of products of my invention, even when taken in excess, as compared to the many and varied undesirable side effects, such as constipation and diarrhea, commonly encountered with products of the prior art.

The aqueous suspension forms of my novel antacid preparations are stable suspensions in that they do not exhibit significant settling or separation. In addition, my preparations consistently maintain the characteristic of ease of redispersion, in the event of any settling. The aqueous suspension antacid preparation forms of my invention exhibit the unusual property of high fluidity; that is, they possess a marked flowability and low viscosity, for such high solids concentration in an aqueous suspension system. The high antacid solids concentrations and acid binding power are many-fold those achievable in simple aqueous systems, prepared in the absence of the gelation agents of this invention.

The dry powder or granular forms of my novel antacid preparations are capable of almost unlimited shelf life, being reconstitutable at any time by the simple addition of small quantities of water and minimal agitation. In addition, the dry powder form can be taken orally as a dosage form, since immediate reconstitution to a fluid consistency, palatable and easily swallowable, is attained with a minimal amount of orally generated salival as compared to the gritty, dry and bland taste and unpalatable oral feel of prior solid products. The tablet form, prepared simply by the compression of the powder form into a tablet, has the same advantages as the powder form when taken orally but has the added advantage of occupying less space when carried by the patient. Both the powder and tablet forms of my novel antacid preparations have the same advantages and therapeutic usefulness as the aqueous suspension form, when ingested to alleviate disorders and diseases of the gastro-intestinal tract.

Thus, my invention encompasses both solid and liquid dosage forms. When the term "solid" is used herein, it includes powders, granules, cakes, compressed tablets or other solid physical forms.

DETAILED DESCRIPTION OF THE INVENTION

In accordance with my invention, there is provided a high active ingredient concentration antacid comprising a major portion of an antacid and a minor proportion of at least one pharmaceutically acceptable gelation agent which is a water-dispersible colloidal anionic ether and ester derivatives of low polymers of monosaccharides, said proportion of the gelation agent being such that a thickened, gel-like consistency occurs upon interaction of my products with gastro-intestinal mucous.

Included within the scope of this invention in any antacid composition embodying any pharmaceutically acceptable antacid ingredient or groups of ingredients which can act as an antacid in the gastro-intestinal tract and which meet the criteria of the phosphate gelation test hereinafter described. Exemplary of such antacid compounds are calcium carbonate, aluminum hydroxide, magnesium hydroxide, magnesium-aluminum trisilicate, bismuth subcarbonate, bismuth hydroxide and magnesium carbonate. Further illustrative of the active antacid compositions that can be used in accordance with my invention are those disclosed in "Antacids" Brody and Bachrach, Amer. J. Diges. Dis. 4: 435–460 (1959), keeping in mind as a guide for selection the criteria of the phosphate gelation test.

The gelation agents of this invention are ionizable low molecular weight long chain chemical compounds. This includes water-dispersible colloidal anionic ether and ester derivatives of low polymers of monosaccharides, exemplary of which are sodium carboxymethyl cellulose, sodium dextran sulfate, degraded carrageenin, mepesulfate (Na salt of sulfated polygalacturonic acid methyl ester methyl glycoside), heparin (sulfuric acid ester of mucoitin—a glycoprotein), sodium lignosulfates, sodium cellulose sulfate, sodium sulfoethylcellulose, sodium cellulose acetate sulfate, sodium chondroitin sulfate and sodium carboxymethyl dextran. It is preferred that 2% aqueous solutions of the agents of this invention exhtibit at 25° C. a viscosity rating of not greater than about 100 centipoises. U.S. Pat. 3,236,735 describes the gelation agents useful in this invention in detail and is, incorporated in this disclosure by reference. It should be noted that agents having a higher viscosity than 100 centipoises in a 2% aqueous solution at 25° C. can be used. However, the use of higher viscosity type gelation agents are limited by their ability to be efficacious in formulations of my invention when tested for gelation in the phosphate gelation test as herein described. Degraded carrageenin is a preferred gelation agent. Commercial carrageenin is a naturally occurring sulphated polysaccharide of marine algae origin which exhibits low toxicity and is stable, inexpensive and readily available. Degraded carrageenin forms aqueous solutions of reduced viscosity as compared with the commercial product. U.S. Pat. No. 3,175,942, disclosing antacid combinations wherein the antacid constituent is present in the conventionally low concentrations of prior art formulations, and relating to the use of degraded carrageenin in high concentrations as an antipepsin ingredient, is exemplary of the preparation of degraded carrageenin. Any of the gelation agents can be used alone or in combination.

The antacid compounds of this invention can be employed singularly or in groups. Combination of more than one chemical antacid into one formulation not only gives improved total formulation from a clinical viewpoint but also can result in increased fluidity as well as facilitating the incorporation of antacids which are otherwise difficult to suspend. I have found that in certain formulations the gelatin agents of this invention increase the total solids concentration of the combined antacid compounds over that degree exhibited by each in combination with the same gelation agent alone. When my antacid formulations contain more than one antacid ingredient, one is generally present in a major proportion. Exemplary is a formulation of from about 55 to about 80% of calcium carbonate, about 15 to about 30% aluminum hydroxide, and about 5 to about 20% magnesium hydroxide, based on the total antacid ingredients.

Because of the different degree of gelation potential of each chemical gelation agent, the amount necessary to add to any particular antacid formulation of my invention to achieve the desired gelation potential will vary depending on the gelation agent used. Also, combinations of gelation agents in any one formulation can be used, but such combinations are not necessarily in direct proportion to that necessary for each gelation agent when used alone, as there can be in some instances a combined beneficial effect requiring a lesser total amount of combined gelation agents than that which would be expected from the amount needed when each is used alone. Likewise, each antacid compound requires a different amount of gelation agent to achieve a utilizable product of my invention. In addition, different physical forms and/or methods of manufacture of a given antacid compound can cause a variation in the amount of gelation agent necessary to be efficacious in formulations of my invention. Because of these variables, the amount of gelation agent necessary for any particular formulation of my invention can be best determined by utilization of the phosphate gelation test, described more fully hereinafter. It is to be noted that for some antacid compounds, certain particle sizes, physical forms or methods of manufacture can affect the efficaciousness of the products of my invention to such a degree that little or no effect can be perceived in the phosphate gelation test. Thus, in selecting the proper physical characteristics of each antacid to be used, these factors must be considered, but can be resolved by the phosphate gelation test.

I believe that the function performed by the foregoing gelation agents embodies a selective adsorption of these agents onto the surface of the suspended antacid particles, imparting to them an elevated electro-negative charge in comparison to their previous state. This increased electro-negative charge accomplishes a number of desirable changes and characteristics for the products of my invention. First, there is a resulting decreased demand for water to preferentially adsorb onto and wet the particles of the antacid in aqueous suspension, which in turn allows more particles to be suspended in a given amount of water. A comparatively higher concentration of active antacid ingredients is thereby attained with high fluidity and low viscosity. Upon neutralization of these electro-negative charges by positively charged gastro-intestinal mucous and secretions, there is a reversal of this process, and increased demand for water by the particles and thus, thickening and gel-like consistency occurs. Thus, when the term "gelation" is used herein, it has reference to the development of such thickening and gel-like consistency as demonstrated by the "phosphate gelation test" hereafter discussed. This gelation places a highly concentrated antacid of much thicker consistency within the upper gastro-intestinal tract, which is of greater degree than could possibly be attained by normal oral ingestion of any other antacid. Secondly, because of the high-electro-negative charge on the active antacid particles adn the opposing electro-positive charge of the gastro-intestinal mucous, secretions (e.g. blood serum) and diseased portions of the gastro-intestinal tract, there is a strong selective attraction to the mucous, areas of diseased linings and ulcer craters. Both of these actions result in tenacious adhesion of the antacid to mucous and diseased linings. Thirdly, because there is a marked low ratio of colloidal additives to active antacid ingredients, the active antacid ingredients can quickly and easily intermix with the acid within the stomach, and the acid being secreted at the mucosal linings and immediate rapid chemical neutralization can occur. Although the therapeutic effectiveness of my invention is not dependent upon the accuracy of these postulated mechanisms I believe it is the above sequence of events and characteristics of the antacid compositions of my invention which allows the rapid on-set of action, the tenacious adherence to mucosal linings and diseased areas, and the subsequent prolonged action of the antacid, which because of tenacious adhesion, is not washed out of the stomach by gastric peristalsis.

Because of this gel structure and consistency, there is prolonged activity as a result of reduced wash-away by gastric peristalsis. Also, it is more difficult for this gel structure to be diluted by gastric secretions.

The products of this invention, being of high antacid active ingredients, require lower dosage volumes to neutralize an equivalent amount of acid than heretofore attainable. The formation of gel structure and increasing viscosity of the products within the gastro-intestinal tract prolongs antacid activity, and thus, reduces the frequency of dosage. This results from reduced wash-out and more tenacious adhesion to gastric linings.

Exemplary of the essential ingredients of a typical antacid formulation of this invention are (percent weight/weight): calcium carbonate 65.6, aluminum hydroxide 20.2, magnesium hydroxide 12.1 and sodium carrageenin 2.1. When 38 gms. of this combined formulation are dispersed in 62 cc. of water, a fluid suspension is attained which, when mixed with 5 cc. of the phosphate solution (defined hereafter) immediately reverts this fluid suspension to a paste consistency.

In the absence of the gelation agents of this invention, it is not possible to achieve a high solids concentration of antacid coupled with a highly fluid antacid suspension. For example, in the typical antacid formulation set forth above, utilizing a simple aqueous system, exclusive of any gelation agent, the maximum solids concentration achievable to attain about equal flow characteristics is no greater than about 25% as opposed to the 38% weight/weight solids antacid attained above. In addition, addition of 5 cc. of phosphate solution to this simple aqueous suspension results in either no change in consistency or a more fluid consistency by virtue of a dilution effect. Furthermore, the product at these solids concentrations level in simple aqueous suspension will settle rapidly and tend to form a cake. It requires the addition of further viscosity increasing additives to maintain a suspended system.

Thus, the prior antacid suspensions are in complete contrast to those of my invention, where the suspending ability results from the high concentration of antacid itself rather than from non-antacid viscosity producing agents.

The finally formulated antacid compositions of this invention, in addition to containing the active antacid and gelation agent ingredients, can contain the usual pharmaceutical excipients such as flavoring agents, sweeteners, coloring agents and, in certain instances, body-building ingredients, e.g., bentonite, methyl cellulose. Exemplary of these non-active ingredients are sorbitol or mannitol and other non-toxic polyhydric alcohols such as polypropylene glycol, which have the desirable effect of sweetening the suspension and making it more palatable for oral administration. Also, the finally formulated antacid compositions of my invention can contain as part of the active antacid ingredients other antacids such as aluminum hydroxide-magnesium carbonate co-precipitate, aluminum hydroxide-magnesium hydroxide co-precipitate, magnesium trisilicate, sodium bicarbonate and basic aluminum aminoacetate, also known as aluminum glycinate, and ion exchange resins.

The optimum concentration for any particular additive is to a considerable degree dependent upon the kinds and proportions of the other additives present in the suspension. It can also vary somewhat with the physical characteristics (such as particle size and specific gravity) of the antacid used. Generally, however, the optimum concentrations of the conventional additives are substantially less than when these same substances have been used in the past, owing in part to their enhanced effectiveness in the presence of higher active antacid concentrations and lower percent water concentration in aqueous systems.

Suitable concentrations of the gelation agents of this invention are those that disperse the antacid quickly and easily to produce a highly fluid, low viscosity aqueous suspension which in contact with the stomach mucous forms a thickened or gel-like physical consistency or gelation as heretofore defined. In general, a ratio comprising a minor proportion of a gelation agent and a major proportion of an antacid, i.e., in a weight ratio of less than 1:1 gelation agent to antacid, can be employed. A ratio of at least about 0.00008 gm. of gelation agent per gm. of antacid in the formulation is sufficient. I prefer to employ a ratio ranging from about 0.005 to about 0.05 (i.e. about 0.5% to about 5% of gelation agent based on the total antacid ingredients). This is known hereafter as the "gelation agent/antacid ratio." However, the amount of gelation agent necessary to be efficacious in any particular antacid formulation of my invention is dependent upon the specific antacid ingredients and the specific gelation agent used as discussed above. This can be determined by utilization of the phosphate gelation test as described below.

I have found that a solution prepared by dissolving 41.6 gm. of $Na_3PO_4.12H_2O$ and 55.3 gm. $NaH_2PO_4.H_2O$ and approximately 25 ml. of hot distilled water, the resulting solution being diluted to a 100 ml. volume can be used in place of gastric mucous to demonstrate in vitro the gelation concept of the product of this invention. I have found by comparing samples obtained from patients that use of such a phosphate solution correlates with gelation occurring by interaction of the antacid suspensions of this invention with gastric mucous in vivo. In carrying out this test, as well as in the utilization of the products of my invention, the amount of water in the aqueous system is not critical; however, from the foregoing discussion it is apparent that the total antacid solids concentration in the suspension using the formulations of this invention must be greater than that which is attained in a simple aqueous system using the same antacid ingredient ratios, without inclusion of gelation agents, at equal viscosity for the compared suspensions and, of course, the solid forms of the antacid formulations must also be capable of producing aqueous suspensions that meet this criterion. Best results are obtained with fresh phosphate solution. When the term "phosphate solution" is used herein it refers to the above described solution. Interacting the antacid formulations of this invention in aqueous suspension with the phosphate solution, added progressively in one or more increments each of which is less than about 2 cc. per 100 grams of the aqueous suspension, is herein referred to as the "phosphate gelation test." A positive result is achieved with this test when the above aqueous antacid suspension of fluid consistency of less than about 300 cps. at 25° C. upon addition of the phosphate solution in the manner described above increases in viscosity to a non-fluid consistency of greater than about 300 cps. at 25° C.

Thus, for a positive phosphate gelation test the following criteria must be met:

(1) The formulation contains a major proportion of antacid and a minor proportion of gelation agent based on the combined total of the antacid and gelation agent in the formulation, (2) An aqueous suspension of the formulation meeting criterion (1) must be capable of containing a greater total antacid-solids concentration and yet be of fluid consistency of less than about 300 cps. at 25° C. than the total antacid-solids concentration that can be attained with the same antacid formulations in a simple aqueous suspension, without inclusion of gelation agents, at that antacid-solids concentration where the simple aqueous suspension becomes of non-fluid consistency of greater than about 300 cps. at 25° C., and (3) Upon the progressive addition in one or more increments, each of which is less than about 2 cc., of phosphate solution, having the composition defined below, per 100 grams of an aqueous suspension of fluid consistency of the formluation meeting the criteria 1 and 2, and containing the gelation agents in aqueous suspension with an antacid-solids concentration greater than that attainable in simple aqueous suspension without inclusion of gelation agent, an increase in viscosity to a viscosity greater than the initial viscosity of the suspension of fluid consistency is obtained, (4) Said phosphate solution being a solution prepared by dissolving 41.6 gm. of $Na_3PO_4.12H_2O$ and 55.3 gm. $NaH_2PO_4.H_2O$ in approximately 25 ml. of hot distilled water, and diluting the resulting solution to a 100 ml. volume.

Because the mucous concentration in gastro-intestinal secretions vary from patient to patient, and because also, the relative reactivity (ability to cause gelation with products of my invention) of gastro-intestinal mucous and other gastro-intestinal secretions varies from patient to patient in its gelation potential, the phosphate gelation test is utilized as a means of standardizing gelation potential of the products of my invention. Although the mucous concentration of gastro-intestinal secretions and gelation reactivity potential varies from patient to patient, the secretions and mucous of all patients are sufficiently reactive to utilize the products of my invention.

In essence, therefore, the phosphate gelation test is a continuing titration to at least that point at which a measurable increase in physical consistency (thickening or semi-gel formation) occurs. Since different antacid compounds or combination of compounds, as well as differences in their physical size or their method of manufacture, require different amounts of gelation agents relative to the amount of antacid used to achieve efficaciousness as products of my invention, different relative amounts of phosphate solution are necessary to cause gelation in the phosphate gelation test, when comparing different antacid formulations. In a like relationship, since different gelation agents are required in different amounts, depending upon which gelation agent, or combination of gelation agents, are used in any given formulation of my invention, again the relative amount of phosphate solution necessary to cause gelation in the phosphate gelation test will vary accordingly with the gelation agent used.

In achieving the most desirable products of my invention, the amount of gelation agent added to the formulation is that which with a phosphate gelation test on a comparative basis to gastro-intestinal mucous, will not develop gelation in the mouth or upper esophagus, but will do so below this anatomical area.

One method of manufacture of the products of this invention involves the dispersion of all colloidal ingredients in water. To this dispersion is added any crystalloid additives. When these are well dispersed, or dissolved, the active antacid ingredients in granule, powder or paste form are slowly added with stirring or agitation until a smooth, homogenous suspension is attained. Flavoring agents and other excipients are then added with continued agitation until equally dispersed throughout the suspension. The suspension can then be milled by high energy agitation, homogenization equipment or roll milling according to the procedures known to the art. This resultant suspension can then be dried in air to produce a powder product or paste which can be compressed into tablet form using conventional techniques. Powdered products by air drying can also be retained in that state for further rehydration at any time. A paste, similar to that attained by air drying the above suspension, can be produced directly by using a lesser amount of water in the initial quantities of the formulation. Although the above described methods of manufacture are efficacious, they are not the only approach to combining the ingredients for manufacture of products of my invention. Other methods will be made evident in the following examples.

The preparations of my invention can also contain other therapeutic substances such as antispasmodics, as for example, dicyclomine hydrochloride or atropine sulfate, mood-modifying drugs, as, for example, sedatives, tranqualizers or anti-depressants, and topical anesthetics, for example, xylocaine.

The preparations of my invention are useful in the treatment of gastro-intestinal disorders in man or animals. Illustrative of such disorders are gastric ulcer, duodenal ulcer, gastritis, hyperchlorhydria, esophagitis and other digestive disturbances. They are generally administered to the patient orally. The dosage form can be an aqueous suspension or a solid, including powders, granules, compressed tablets or other physical shapes. The dosages of my formulations will vary depending upon the individual antacid components thereof. In general the therapeutic dosage can best be determined by the relationship of the acid consuming power of my formulation in comparison to known antacids. Typical dosage ranges are set forth in the following examples.

The following examples demonstrate the invention. Unless otherwise specified the following particulars apply to data disclosed in the examples:

(1) Viscosity data was determined by means of the Brookfield Viscometer Model LVF, using a No. 2 spindle or a No. 3 spindle as dictated by the viscosity range of the sample and at the highest possible r.p.m. for that viscosity range and spindle, unless otherwise specified. Data are reported in centipoises (cps.) and taken at 25° C.

(2) Percentages are weight/weight, (percent w./w.).

Example I demonstrates a typical liquid formulation of my invention.

EXAMPLE I

| Ingredient: | Percent w./w. |
| --- | --- |
| Calcium carbonate, ppt. U.S.P. (light powder) [4] | 25.48 |
| Aluminum hydroxide, dried gel, N.F.[1] | 7.83 |
| Magnesium hydroxide, N.F. | 4.69 |
| Sorbitol, U.S.P. | 3.00 |
| Mannitol, N.F. | 3.00 |
| Propylene glycol, U.S.P. | 3.00 |
| Sodium carrageenin [2] | 0.80 |
| Methylcellulose, U.S.P.[3] | 0.30 |
| Calcium sucaryl, U.S.P. | 0.075 |
| Peppermint flavor | 0.30 |
| Methyl paraben | 0.13 |
| Propyl paraben | 0.02 |
| Distilled water, qs. | 100.00 |

[1] A completely hydrated amorphous aluminum oxide meeting U.S.P. specifications, manufactured by J. T. Baker Chemical Co. as a medium powder having the following bulk density specifications and typical mesh values: 12–18 lbs./cu. ft. (TKV) 6.5–9.5 cc./g., and 0.15–0.11 g./cc., 2% on U.S. No. 325, and 98% thru U.S. No. 325.
[2] A free flowing light cream to tan powder, pH (1.5% w./v. solution at 30° C.) 7.0 to 8.5; moisture (Azeotropic distillation. U.S.P. XVII page 925. Use a 25 gm. sample.) 12.0% maximum; viscosity (determined on a Brookfield LVF–5X viscometer using a 1.0% w./w. solution; Spindle #1 at 60 r.p.m.) 4 to 7 cps.; heavy metals (U.S.P. XVII page 877) Method II.) 10 p.p.m. maximum; arsenic (use U.S.P. XVII page 868) 2 p.p.m. maximum; material purchased from Marine Colloids, Inc. as Viscarin XLV.
[3] Methocel MC (15 cps.), Dow Chemical Co.
[4] J. T. Baker Chemical Co., Catalog No. 1300.

The sodium carrageenin was thoroughly dispersed in 10 parts of water and the methylcellulose was thoroughly dispersed in a separate 10 parts of water. The methyl and propyl paraben were dissolved in the remaining water. These three solutions were then combined and the sorbitol, mannitol, propylene glycol, and calcium sucaryl was dissolved in the aqueous system. With mild agitation from a rotating stirrer, the calcium carbonate was sifted into the water and stirred until thoroughly dispersed. The aluminum hydroxide was then added in the same manner as the calcium carbonate, followed by the magnesium hydroxide. Once the smooth homogenous suspension was attained, the whole suspension was passed through a colloid mill. The peppermint flavor was then added and thoroughly mixed into the suspension with agitation.

The resulting suspension was stable with minimal settling after standing in an enclosed bottle for 6 months. The minimal settling was immediately redispersed with two shakes of the bottle.

The resulting suspension had a smooth, fluid consistency with a measured viscosity of 250 cps. Upon progressive addition of phosphate solution described above to 100 gm. of this suspension, the viscosity increased progressively to 2300 cps. with addition of 2 cc. phosphate solution and then to a paste with a viscosity of 17,000 cps. upon addition of a total of 7 cc. of phosphate solution. The addition of phosphate solution was thus done progressively and in one or more increments each of which was less than about 2 cc. per 100 grams of the aqueous suspension. This same procedure was followed in all of the following examples.

When tested for acid consuming capacity by the Titration Method, U.S.P. XVI, the suspension neutralized 9.239 meq./gm. and 57.403 meq./teaspoon.

When used in the treatment of patients at a dose of one teaspoon, there was a rapid on-set of action in 1–3 minutes, with prolonged clinical relief for 60 minutes. Gastroscopic observation at 60 minutes after ingestion revealed small patches of antacid still adherent to the mucosa. And in cases of patients with gastric ulcer disease the antacid was seen adherent to the base of the ulcer. The pH of the stomach was maintained in the range of 2.5–5 at this dosage level and time interval. Such dramatic results have not heretofore been reported with any known antacid composition.

The recommended dosage for this antacid suspension is one teaspoon four times a day or as needed.

EXAMPLE II

Employing the procedure of Example I, a similar suspension was made and subsequently air dried into a fine, flaky powder by coating the liquid suspension onto a glass plate in a 3 mil thickness, and upon drying, scraping it off to form the powder.

When 48 gms. of this powder was mixed with 52 cc. of water and shaken for 5 seconds, there was immediate redispersion to a suspension identical to the original giving an essentially identical result in the phosphate gelation test, therapeutic tests, acid binding power and shelf storage tests.

Also, when 3 gms. of this powder were taken in the dry state, orally, the powder dissolved rapidly in the oral secretions and was easily swallowed. Therapeutic results obtained from taking this powder in a dosage of 3 gms. four times a day was almost identical to that obtained with the original liquid suspension taken at one teaspoon four times a day. Such dehydration and subsequent rehydration of antacid suspensions is believed novel. Also, direct oral ingestion of dry antacid powders is new. Previously the large volumes of saliva necessary to sufficiently disperse other antacid powders for swallowing made it most difficult. Also, the unpalatable pasty consistency of other powders is totally unacceptable to the patient.

EXAMPLE III

The dry powder antacid composition produced in the manner of Example II was used to make tablets. When 100 gms. of the above powder was lightly moistened with 20 cc. of water, a slightly sticky powder was obtained. This was easily made into a tablet by compressing 2 gms. of the moistened powder into tablet form and allowing the tablet to air dry. These tablets had excellent adhesiveness, maintaining their integrity even with moderate traumatic abuse. When taken orally at a dosage of two tablets four times a day or as needed, the clinical effectiveness was equal to or greater than that achieved with the original liquid suspension of Example I when taken at a dosage of one teaspoon four times a day. These tablets dissolved readily in the mouth with a very smooth, pleasant nongritty taste and the high concentration suspension almost immediately formed with the saliva was easily swallowed.

Two tablets dissolved in 3.5 cc. of water gave a fluid suspension and upon addition of 0.25 cc. (5 drops) of phosphate solution, the suspension converted to a paste. This progressive addition, a drop at a time, is equivalent to 0.735 cc. of phosphate solution per 100 grams of the aqueous antacid suspension.

Physical forms of spheres, cubes or other unusual shapes can be easily formed by preparing a putty-like paste from mixing 100 gms. of dry powder with 30 cc. of water. The paste can be extruded into the form desired and air dried. For example, from the above formed paste small cubes and spheres were formed, each containing 1.3 gms. of paste, which when dried gave 1 gm. of antacid dry formulation. Such candy-like physical forms dissolved in the mouth in the same manner as the tablet forms and were equally effective when taken in equal weight quantities (e.g., three 1 gm. cubes were about as equally as effective as two tablets described above).

Tablets have also been made by techniques, common to the art, of combining all non-aqueous ingredients of Example I in a homogenous, slightly moistened powder containing powdered sugar as a diluent and compressing the powder into 1.5 gm. tablets containing about 0.8 gm. active antacid ingredients. When taken orally at a dosage of three tablets four times a day or as needed, the clinical effectiveness was about equal to that achieved with the product of Example I.

The following examples further illustrate other compositions of this invention utilizing a variety of antacids and gelation agents. The formulations are liquid suspensions prepared by adding the gelation agent and adjuvants to water and stirring until dispersed or dissolved. To this mixture is then added the antacid ingredient with stirring until a homogenous suspension results.

EXAMPLE IV

| Ingredient | Percent w./w. | |
|---|---|---|
| | Control | Composition |
| Magnesium hydroxide, U.S.P.[1] | 35.00 | 35.00 |
| Mannitol, N.F. | 6.00 | 6.00 |
| Propylene glycol, U.S.P. | 3.00 | 3.00 |
| Degraded carrageenin (see Example I) | | 0.75 |
| Water | 56.00 | 55.25 |

| | Viscosity, cps. | |
|---|---|---|
| Initial | 1,020 | 300 |
| Addition of 2 cc. of 10% degraded carrageenin solution to product; 2 cc. of water added to control | 1,420 | 55 |
| Phosphate gelation test: Addition of 5 cc. of phosphate solution | 1,300 | (²) |

[1] Mallinckrodt Chemical Works, lot NM182.
² Semi-gel.

The example demonstrates that at a gelation agent/antacid ratio of 0.0214 a borderline fluid consistency of 300 cps. at 25° C. is achieved (initial viscosity) but when the ratio for this particular antacid is increased by the addition of more gelation agent to a ratio of 0.0271 a more fluid and desirable consistency of less than 300 cps. at 25° C., i.e., 55 cps. is obtained, while the control had a non-fluid consistency of greater than 300 cps. at 25° C., i.e., 1020 cps. and 1420 cps. Utilization of the phosphate gelation test shows no gelation effect on the control but brings about marked increased consistency of the antacid composition to a semi-gel.

EXAMPLE V

| Ingredient | Percent w./w. | |
|---|---|---|
| | Control | Composition |
| Aluminum hydroxide, U.S.P. (heavy type)[1] | 66.00 | 66.00 |
| Mannitol, N.F. | 2.00 | 2.00 |
| Degraded carrageenin (see Example I) | | 0.07 |
| Water | 32.00 | 31.93 |

| | Viscosity, cps. | |
|---|---|---|
| Initial | 800 | 40 |
| Phosphate gelation test: Addition of 2 cc. of phosphate solution | 725 | 860 |

[1] Mallinckrodt Chemical Works, lot NM183.

As demonstrated by this example, this particular antacid requires a very low gelation agent/antacid ratio of 0.00106 yet achieves a positive phosphate gelation test and effectiveness.

EXAMPLE VI

| Ingredient | Percent w./w. | |
|---|---|---|
| | Control | Composition |
| Aluminum hydroxide, U.S.P. (medium type)[1] | 60.00 | 60.00 |
| Mannitol, N.F. | 2.00 | 2.00 |
| Degraded carrageenin (see Example I) | | 0.20 |
| Water | 38.00 | 37.80 |

| | Viscosity, cps. (60 r.p.m.) | |
|---|---|---|
| Initial | 320 | 25 |
| Phosphate gelation test: Addition of 3 cc. of phosphate solution | 300 | 300 |

[1] Bulk density 19–23 lb./cu. ft.; typical mesh—15% retained on U.S. No. 325, 85% through U.S. No. 325. J. T. Baker Chemical Co., lot 37311.

This antacid, although of the same chemical structure, requires a greater gelation agent/antacid ratio of 0.00333 than Example V. This example compared to Example V wherein the antacid particle size is larger, demonstrates that as particle size decreases the amount of gelation agent necessary for a positive gelation test and effectiveness increases and the total antacid solids that can be achieved decreases.

EXAMPLE VII

| Ingredient | Percent w./w. | |
|---|---|---|
| | Control | Composition |
| Magnesium aluminum trisilicate[1] | 30.00 | 30.00 |
| Mannitol | 3.00 | 3.00 |
| Dextran sulfate[2] | | .325 |
| Water | 67.00 | 66.625 |

| | Viscosity, cps. | |
|---|---|---|
| Initial: | | |
| 60 r.p.m. | 540 | 290 |
| 30 r.p.m. | 720 | 420 |
| 12 r.p.m. | 1,150 | 750 |
| Phosphate gelation test; Addition of 1.3 cc. of phosphate solution: | | |
| 60 r.p.m. | 550 | 370 |
| 30 r.p.m. | 800 | 540 |
| 12 r.p.m. | 1,150 | 900 |
| Addition of additional 0.7 cc. of phosphate solution: | | |
| 60 r.p.m. | 550 | 500 |
| 30 r.p.m. | 800 | 700 |
| 12 r.p.m. | 1,150 | 1,200 |

[1] MgO, 13%; Al₂O₃, 21%; SiO₂, 33%; loss on drying, 31%; bulk, 70 fluid oz./lb.; particle size, all through U.S. No. 325, Mallinckrodt Chemical Works, lot 9011M1.
[2] Clinical grade, potency 15.1 units/mg., Glaxo Laboratories, Ltd. (manufactured October 1963).

This example demonstrates that not only does addition of gelation agent to an antacid decrease the viscosity of aqueous systems, but there is also a decrease in the degree of thixotrophy (i.e. increased viscosity with decreased rate of shear). With a positive phosphate gelation test, there is reversion to the original more thixotrophic gel-like consistency as would be desired and experienced in vivo.

EXAMPLE VIII

| Ingredient | Percent w./w. | |
|---|---|---|
| | Control | Composition |
| Calcium carbonate, U.S.P.[1] | 37.0 | 37.0 |
| Mannitol, N.F | 2.5 | 2.5 |
| Propylene glycol, U.S.P | 1.9 | 1.9 |
| Degraded carrageenin (see Example I) | | 0.8 |
| Glycerin | 3.8 | 3.8 |
| Water | 54.8 | 54.0 |

[1] Lot 741442, Fischer Chemical Company.

EXAMPLE IX

| Ingredient | Percent w./w. | |
|---|---|---|
| | Control | Composition |
| Magnesium carbonate, U.S.P. (light powder) | 21.4 | 21.4 |
| Mannitol, N.F | 3.8 | 3.8 |
| Degraded carrageenin (see Example I) | | 0.5 |
| Water | 74.8 | 74.3 |

| | Viscosity, cps. | |
|---|---|---|
| Initial | 1,080 | 250 |
| Phosphate gelation test: | | |
| Addition of 1.5 cc. of phosphate solution | | 910 |
| Addition of 0.75 cc. of additional phosphate solution | | Paste |

This example shows a high gelation agent/antacid ratio of 0.0233 (e.g. 22 times greater than the ratio of 0.00106 of Example V), and the positive phosphate gelation test shows conversion to a much thicker consistency than the original consistency of the control.

EXAMPLE X

| | Type formulation | | | | | | |
|---|---|---|---|---|---|---|---|
| | Percent w./w.[1] | | | | | | |
| | Control | Degraded[2] carrageenin | Dextran[3] sulfate | "Mepesulfate"[4] | "Marasperse C"[5] | "CMC-7L2P"[6] | Percent solids antacid |
| Formulation No. | 1 | 2 | 3 | 4 | 5 | 6 | |
| Magnesium aluminum trisilicate (see Example VII) | 30 | 30 | 30 | 30 | 30 | 30 | |
| Mannitol, N.F | 6 | 6 | 6 | 6 | 6 | 6 | |
| Propylene glycol | 1 | 1 | 1 | 1 | 1 | 1 | |
| Water | 63 | 60 | 60 | 60 | 60 | 60 | |
| Gelation agent 10% w./w. solution | | 3 | 3 | 3 | 3 | 3 | |
| Viscosity, cps.: | | | | | | | |
| Initial | 425 | 212.5 | 325 | 185 | 315 | 750 | 30 |
| 2 cc. additional gelation agent or water[7] | 355 | 127.5 | 200 | 105 | 150 | 290 | 29.4 |
| Do[7] | 285 | 83.8 | 140 | 77.5 | 77.5 | 170 | 28.8 |
| Do[7] | 200 | 61.3 | 103.8 | 60 | 45 | 107.5 | 28.3 |

[1] All formulations and additions shown above are based on a 100 gm. sample of antacid system.
[2] See Example I.
[3] See Example VII.
[4] Sodium salt of sulfated polygalacturonic acid methyl ester methyl glycoside (Chemical Abstracts 52, 16,607(b) 1958 and U.S. Patent 2,599,564).
[5] A water soluble lignosulfate, Marathon Division of American Can Co.
[6] Sodium carboxymethyl cellulose, U.S.P., degree of substitution 0.65–0.85 and 2% viscosity less than 18 cps.
[7] Control formula—only water added to match dilution effect of gelatin agent.

The control was a pasty mass whereas the composition, an embodiment of this invention, was a highly fluid suspension. Upon addition of 5 cc. of phosphate solution to each, the composition turned to pasty consistency similar to the control. The control was unchanged by addition of the phosphate solution.

Substantially similar results are attained by the substitution in the above formulation of the degraded carrageenin at 0.8% w./w., with heparin at 0.6% w./w., sodium carboxymethylhydroxyethylcellulose at 1.0% w./w., sodium cellulose sulfate at 0.9% w./w., sodium sulfoethylcellulose at 1.0% w./w., sodium cellulose acetate sulfate at 1.0% w./w., or sodium chondroitin sulfate at 0.8% w./w.

The examples of this table show the varying degree of improved fluid consistency attained in the same antacid formulation when each gelation agent is added at the same gelatin agent/antacid ratio. A positive phosphate gelation test was achieved with each composition containing a gelation agent and the degree of thickening was about the same for each.

EXAMPLE XI

| Composition | A | B |
|---|---|---|
| Magnesium aluminum trisilicate lot 9011M1 (see Example VII) | 18.75 | 12.5 |
| CaCO₃, Fisher lot 741442 (see Example VIII) | 12.5 | 18.75 |
| Al(OH)₃, (see Example I) | 3.125 | 3.125 |
| Mannitol | 3.125 | 3.125 |
| Water | 62.5 | 62.5 |

COMPOSITION A—GELATION AGENT—10% SOLUTION W./W. DEGRADED CARRAGEENIN (SEE EXAMPLE I)

| | Viscosity, cps. | | | | | | |
|---|---|---|---|---|---|---|---|
| Brookfield speed | Initial | 2.5 cc. of gelation agent | Additional 1.25 cc. of gelation agent | Additional 1.25 cc. of gelation agent | Additional 1.25 cc. of gelation agent | Additional 1.25 cc. of gelation agent | Addition of 1.25 cc. of phosphate solution |
| R.p.m.: | | | | | | | |
| 60 | 1,530 | 940 | 780 | 540 | 410 | 300 | 780 |
| 30 | 1,720 | 1,200 | 1,040 | 760 | 560 | 440 | 1,080 |
| 12 | 2,500 | 1,900 | 1,600 | 1,300 | 1,000 | 800 | 1,800 |
| Composition B—Gelation agent—10% solution w./w. degraded carrageenin (see Example I) | | | | | | | |
| 60 | 1,560 | 1,000 | (¹) | 400 | 250 | 185 | 800 |
| 30 | 1,880 | 1,200 | (¹) | 540 | 340 | 264 | 1,060 |
| 12 | 2,600 | 1,900 | (¹) | 900 | 580 | 450 | 1,750 |

[1] This amount of gelation agent was added but viscosity was not taken.

This example illustrates that in an antacid composition containing more than one active antacid ingredient, a change in the ratio of each antacid ingredient to each other, even though the total active antacid percent remains the same in an aqueous suspension, changes the gelation agent/antacid ratio necessary to achieve the same degree of fluid consistency prior to gelation; however, in the phosphate gelation test, a substantially equal degree of gelation consistency is achieved.

EXAMPLE XII

| Ingredient: | Percent w./w. composition |
|---|---|
| Calcium carbonate, U.S.P. (see Example VIII) | 37.0 |
| Mannitol, N.F. | 2.5 |
| Propylene glycol, U.S.P. | 1.9 |
| Degraded carrageenin (see Example I) | 0.4 |
| Dextran sulfate (see Example VII) | 0.4 |
| Glycerin | 3.8 |
| Water | 54.0 |

This composition is a highly fluid suspension with a consistency almost identical to the composition of Example VIII. Upon addition of 5 cc. of phosphate solution to this composition, a pasty consistency is achieved, which is similar to that attained with the composition of Example VIII when an equal amount of phosphate solution is added to it.

EXAMPLE XIII

| Composition | 1 | 2 | 3 |
|---|---|---|---|
| Magnesium aluminum trisilicate (lot 9011M1) (see Example VII) | 30 | 27 | 25 |
| Al(OH)₃ (see Example I) | | 3 | 5 |
| Mannitol, N. F. | 6 | 6 | 6 |
| Propylene glycol, U.S.P. | 1 | 1 | 1 |
| 10% w./w. solution degraded carrageenin (see Example I) | 4 | 4 | 4 |
| Water | 59 | 59 | 59 |
| | Viscosity, cps. | | |
| Initial | 170 | 220 | 385 |
| Addition of 2 cc. 10% w./w. solution degraded carrageenin (see Example I) | 100 | 95 | 135 |
| Addition of 1 cc. 10% w./w. solution degraded carrageenin (see Example I) | 78 | 70 | 80 |

This example demonstrates the unexpected results that can occur upon mixing different antacid ingredients in a total antacid formulation. The partial replacement of the primary antacid with a low concentration of an antacid whose maximum attainable concentration in suspension is less than that of the primary results, as shown in this example, in a lower viscosity than the same total primary antacid solids alone; yet, at higher concentrations of substitution in the same basic formulation, this secondary antacid causes an increase in viscosity of the formulation even though the gelation agent/antacid ratio is kept constant at all times.

EXAMPLE XIV

| | Percent w./w. | |
|---|---|---|
| Ingredient | Control | Composition |
| Bismuth subcarbonate, extra light powder ¹ | 35.6 | 35.6 |
| Propylene glycol, U.S.P. | 2.4 | 2.4 |
| Glycerine, U.S.P. | 2.4 | 2.4 |
| Dextran sulfate (see Example VII) | | 0.14 |
| Water | 59.6 | 59.46 |

¹ Mallinckrodt Chemical Works, code 0299, lot 0299M2.

The control had the consistency of a very thick paste while the composition, an embodiment of this invention, was a highly fluid suspension. Upon addition of 3 cc. of phosphate solution to each of both formulations no significant change occurred in the control, but the composition immediately turned to a thick paste.

EXAMPLE XV

| | Percent w./w. | |
|---|---|---|
| Ingredient | Control | Composition |
| Bismuth subcarbonate (see Example XIV) | 17.20 | 17.20 |
| Aluminum hydroxide-magnesium carbonate co-precipitate ¹ | 17.20 | 17.20 |
| Propylene glycol, U.S.P. | 4.60 | 4.60 |
| Glycerine, U.S.P. | 4.60 | 4.60 |
| Dextran sulfate | | 0.14 |
| Water | 56.40 | 56.26 |

¹ Reheis Chemical Co., code FMA-11, batch 12400.

The control formulation was a thick paste while the composition was a slightly thixotrophic, creamy fluid suspension. Upon addition of 3 cc. of phosphate solution to each of both formulations, there was no significant change in the paste consistency of the control, but the composition turned to a paste similar to the control.

EXAMPLE XVI

| | Percent w./w. | |
|---|---|---|
| Ingredient | Control | Composition |
| Magnesium aluminum trisilicate ¹ | 30.00 | 30.00 |
| Sodium carboxymethyl dextran ² | | 0.35 |
| Water | 70.00 | 69.65 |
| | Viscosity, cps. | |
| Initial | 460 | 58 |
| Phosphate gelation test: | | |
| Addition of 1.0 cc. of phosphate solution | 405 | 264 |
| Do | | 316 |
| Do | | 328 |
| Do | | 340 |
| Do | | 367 |
| Do | | 394 |
| Do | | 400 |
| Do | | 407 |

¹ See Example VII.
² Degree of substitution 1.4; intrinsic viscosity of 0.314; viscosity of 31.5 cps. in 19% aqueous solution at 25° C.; supplied by Pharmachem Corp., Bethlehem, Pa.

This example demonstrates that the control at 30% w./w. antacid solids is of a non-fluid consistency of 460 cps. at 25° C. (i.e. greater than 300 cps.) while the formulation containing the gelation agent with equal antacid solid concentration is of a very fluid consistency of 58 cps. at 25° C. (i.e. less than 300 cps.). Addition of phosphate solution in increments of 1 cc. per 100 grams of the aqueous suspension resulted in a progressive increase in viscosity to a viscosity of 407 cps. upon the total addition of 8 cc. of phosphate solution while in comparison addition of 1 cc. of phosphate solution to the control resulted in a decrease in viscosity from 460 to 405 cps.

Following the procedure of Example I with the exception that the magnesium carbonate and/or the aluminum hydroxide, are substituted by one or more of the following antacids in varying proportions, which can be selected by the determination of the suitable gelation agent/antacid ratios and the phosphate gelation test, as illustrated in the foregoing examples, an effective antacid product in accordance with by invention is obtained: sodium bicarbonate, aluminum hydroxide-magnesium hydroxide coprecipitate, aluminum hydroxide-magnesium carbonate coprecipitate, magnesium trisilicate, bismuth hydroxide, basic aluminum aminoacetate.

It is to be understood that to produce finished formulations suitable excipients as described above are to be added to the basic formulations of Examples IV to XVI. Also, the liquid suspension of these examples can be converted to or prepared as solid forms by the procedures of Examples II and III.

Some suspensions of this invention tend to develop a gel formation upon prolonged standing with or without inclusion of the gelation agents of this invention. This is a different type of gelation than that obtained with the phosphate gelation test. The above discussed agents, such as sorbitol, mannitol or propylene glycol, serve an additional function in that they prevent this type of gelation during storage in aqueous suspensions.

I claim:
1. An antacid formulation comprising a major proportion of an antacid and a minor proportion of at least one pharmaceutically acceptable gelation agent which is a water-dispersible colloidal anionic ether and ester derivative of low polymers of monosaccharides, a 2% aqueous solution of which gelation agent exhibits at 25° C. a viscosity rating of not greater than about 100 centipoises, said formulation being such that it meets the following criteria:
   (1) the formulation contains a major proportion of antacid and a minor proportion of gelation agent based on the combined total of the antacid and gelation agent in the formulation,
   (2) an aqueous suspension of the formulation meeting criterion (1) must be capable of containing a greater total antacid-solids concentration and yet be of fluid consistency of less than about 300 cps. at 25° C. than the total antacid-solids concentration that can be attained with the same antacid formulations in a simple aqueous suspension, without inclusion of gelation agents, at that antacid-solids concentration where the simple aqueous suspension becomes of non-fluid consistency of greater than about 300 cps. at 25° C., and
   (3) upon the progressive addition of less than about 2 cc. increments of phosphate solution, having the composition defined below, per 100 grams of an aqueous suspension of fluid consistency of the formulation meeting the criteria 1 and 2, and containing the gelation agents in aqueous suspension with an antacid-solids concentration greater than that attainable in simple aqueous suspension without inclusion of gelation agent, an increase in viscosity to a viscosity greater than the initial viscosity of the suspension of fluid consistency is obtained,
   (4) said phosphate solution being a solution prepared by dissolving 41.6 gm of $Na_3PO_4 \cdot 12H_2O$ and 55.3 gm. $NaH_2PO_4 \cdot H_2O$ in approximately 25 ml. of hot distilled water, and diluting the resulting solution to a 100 ml. volume.

2. The composition of claim 1 wherein the antacid is selected from the group consisting of calcium carbonate, aluminum hydroxide, magnesium-aluminum trisilicate, bismuth subcarbonate, bismuth hydroxide, magnesium carbonate, magnesium hydroxide and mixtures thereof.

3. The composition of claim 2 containing in addition an antacid selected from the group consisting of aluminum hydroxide-magnesium carbonate co-precipitate, aluminum hydroxide-magnesium hydroxide co-precipitate, magnesium trisilicate, sodium bicarbonate, basic aluminum aminoacetate, and mixtures thereof.

4. The composition of claim 1 wherein the gelation agent is sodium carboxymethyl cellulose, sodium carboxymethylhydroxyethyl cellulose, sodium dextran sulfate, degraded carrageenin, sodium salt of sulfated polygalacturonic acid methyl ester methyl glycoside, heparin, sodium lignosulfate, sodium cellulose sulfate, sodium sulfoethylcellulose, sodium cellulose acetate sulfate, sodium chondroitin sulfate or sodium carboxymethyl dextran.

5. The composition of claim 2 wherein the gelation agent is sodium carboxymethyl cellulose, sodium carboxymethylhydroxyethyl cellulose, sodium dextran sulfate, degraded carrageenin, sodium salt of sulfated polygalacturonic acid methyl ester methyl glycoside, heparin, sodium lignosulfate, sodium cellulose sulfate, sodium sulfoethylcellulose, sodium cellulose acetate sulfate, sodium chondroitin sulfate or sodium carboxymethyl dextran.

6. The composition of claim 3 wherein the gelation agent is sodium carboxymethyl cellulose, sodium carboxymethylhydroxyethyl cellulose, sodium dextran sulfate, degraded carrageenin, sodium salt of sulfated polygalacturonic acid methyl ester methyl glycoside, heparin, sodium lignosulfate, sodium cellulose sulfate, sodium sulfoethylcellulose, sodium cellulose acetate sulfate, sodium chondroitin sulfate or sodium carboxymethyl dextran.

7. The composition of claim 1 wherein said antacid is calcium carbonate.

8. The composition of claim 1 wherein said antacid is magnesium hydroxide.

9. The composition of claim 1 wherein said antacid is aluminum hydroxide.

10. The composition of claim 1 wherein said antacid is magnesium-aluminum trisilicate.

11. The composition of claim 1 wherein said antacid is magnesium carbonate.

12. The composition of claim 1 wherein the antacid comprises a major proportion of calcium carbonate and a minor proportion of magnesium hydroxide.

13. The composition of claim 1 wherein the antacid comprises a major proportion of calcium carbonate and a minor proportion of aluminum hydroxide.

14. The composition of claim 1 wherein the antacid comprises a major proportion of calcium carbonate and a minor proportion each of aluminum hydroxide and magnesium hydroxide.

15. The composition of claim 14 containing a gelation agent selected from the group consisting of degraded carrageenin, sodium salt of sulfated polygalacturonic acid methyl ester methyl glycoside, sodium lignosulfate, sodium dextran sulfate and sodium carboxymethyl cellulose.

16. The composition of claim 12 containing a gelation agent selected from the group consisting of degraded carrageenin, sodium salt of sulfated polygalacturonic acid methyl ester methyl glycoside, sodium lignosulfate, sodium dextran sulfate and sodium carboxymethyl cellulose.

17. The composition of claim 13 containing a gelation agent selected from the group consisting of degraded carrageenin, sodium salt of sulfated polygalacturonic acid methyl ester methyl glycoside, sodium lignosulfate, sodium dextran sulfate and sodium carboxymethyl cellulose.

18. The composition of claim 1 in the form of an aqueous suspension.

19. The composition of claim 1 in solid form.

20. The composition of claim 19 in the form of a compressed tablet.

21. A method of controlling gastric acidity which comprises orally administering to a patient a safe and effective amount of the composition of claim 1.

22. A method of controlling gastric acidity which comprises orally administering to a patient a safe and effective amount of the composition of claim 25.

23. The composition of claim 19 in the form of a powder.

24. An antacid formulation consisting essentially of, on a percent weight/weight basis and based upon the following ingredients, about 54% calcium carbonate, about 16% aluminum hydroxide, about 10% magnesium hydroxide, about 6% sorbitol, about 6% mannitol, about 6% propylene glycol, and about 2% degraded carrageenin as a gelation agent, a 2% aqueous solution of which degraded carrageenin at 25° C. has a viscosity rating not greater than about 100 centipoises, said formulation being such that it meets the following criteria:
(1) the formulation contains a major proportion of antacid and a minor proportion of gelation agent based on the combined total of the antacid and gelation agent in the formulation,
(2) an aqueous suspension of the formulation meeting criterion (1) must be capable of containing a greater total antacid-solids concentration and yet be of fluid consistency of less than about 300 cps. at 25° C. than the total antacid-solids concentration that can be attained with the same antacid formulations in a simple aqueous suspension, without inclusion of gelation agents, at that antacid-solids concentration where the simple aqueous suspension becomes of non-fluid consistency of greater than about 300 cps. at 25° C., and
(3) upon the progressive addition, of less than about 2 cc. increments of phosphate solution, having the composition defined below, per 100 grams of an aqueous suspension of fluid consistency of the formulation meeting the criteria 1 and 2, and containing the gelation agents in aqueous suspension with an antacid-solids concentration greater than that attainable in simple aqueous suspension without inclusion of gelation agent, an increase in viscosity to a viscosity greater than the initial viscosity of the suspension of fluid consistency is obtained,
(4) said phosphate solution being a solution prepared by dissolving 41.6 gm. of $Na_3PO_4 \cdot 12H_2O$ and 55.3 gm. $NaH_2PO_4 \cdot H_2O$ in approximately 25 ml. of hot distilled water, and diluting the resulting solution to a 100 ml. volume.

25. An antacid formulation consisting essentially of, on a percent weight/weight basis and based upon the following ingredients, about 66% calcium carbonate, about 20% aluminum hydroxide, about 12% magnesium hydroxide, and about 2% degraded carrageenin as a gelation agent, a 2% aqueous solution of which degraded carrageenin at 25° C. has a viscosity rating not greater than about 100 centipoises, said formulation being such that it meets the following criteria:
(1) the formulation contains a major proportion of antacid and a minor proportion of gelation agent based on the combined total of the antacid and gelation agent in the formulation,
(2) an aqueous suspension of the formulation meeting criterion (1) must be capable of containing a greater total antacid-solids concentration and yet be of fluid consistency of less than about 300 cps. at 25° C. than the total antacid-solids concentration that can be attained with the same antacid formulations in a simple aqueous suspension, wihout inclusion of gelation agents, at that antacid-solids concentration where the simple aqueous suspension becomes of non-fluid consistency of greater than about 300 cps. at 25° C., and
(3) upon the progressive addition, of less than about 2 cc. increments of phosphate solution, having the composition defined below, per 100 grams of an aqueous suspension of fluid consistency of the formulation meeting the criteria 1 and 2, and containing the gelation agents in aqueous suspension with an antacid-solids concentration greater than that attainable in simple aqueous suspension without inclusion of gelation agent, an increase in viscosity to a viscosity greater than the initial viscosity of the suspension of fluid consistency is obtained,
(4) said phosphate solution being a solution prepared by dissolving 41.6 gm. of $Na_3PO_4 \cdot 12H_2O$ and 55.3 gm. $NaH_2PO_4 \cdot H_2O$ in approximately 25 ml. of hot distilled water, and diluting the resulting solution to a 100 ml. volume.

26. An antacid formulation consisting essentially of, on a percent weight/weight basis and based on the total antacid in the composition, from about 55 to about 80% calcium carbonate, from about 15 to 30% aluminum hydroxide, from about 5 to 20 % magnesium hydroxide, and also containing from about 0.5 to about 5%, based on the total antacid ingredients, of at least one pharmaceutically acceptable gelation agent which is a water-dispersible colloidal anionic ether and ester derivative of low polymers of monosaccharides, a 2% aqueous solution of which agent exhibits at 25° C. a viscosity rating of not greater than about 100 centipoises, said formulation being such that it meets the following criteria:
(1) the formulation contains a major proportion of antacid and a minor proportion of gelation agent based on the combined total of the antacid and gelation agent in the formulation,
(2) an aqueous suspension of the formulation meeting criterion (1) must be capable of containing a greater total antacid-solids concentration and yet be of fluid consistency of less than about 300 cps. at 25° C. than the total antacid-solids concentration that can be attained with the same antacid formulations in a simple aqueous suspension, without inclusion of gelation agents, at that antacid-solids concentration where the simple aqueous suspension becomes of non-fluid consistency of greater than about 300 cps. at 25° C., and
(3) upon the progressive addition of less than about 2 cc. increments of phosphate solution, having the composition defined below, per 100 grams of an aqueous suspension of fluid consistency of the formulation meeting the criteria 1 and 2, and containing the gelation agents in aqueous suspension with an antacid-solids concentration greater than that attainable in simple aqueous suspension without inclusion of gelation agent, an increase in viscosity to a viscosity greater than the initial viscosity of the suspension of fluid consistency is obtained,
(4) said phosphate solution being a solution prepared by dissolving 41.6 gm. of $Na_3PO_4 \cdot 12H_2O$ and 55.3 gm. $NaH_2PO_4 \cdot H_2O$ in approximately 25 ml. of hot distilled water, and diluting the resulting solution to a 100 ml. volume.

27. The composition of claim 26 wherein the gelation agent is sodium carboxymethyl cellulose, sodium carboxymethylhydroxyethyl cellulose, sodium dextran sulfate, degraded carrageenin, sodium salt of sulfated polygalacturonic acid methyl ester methyl glycoside, heparin, sodium lignosulfate, sodium cellulose sulfate, sodium sulfoethylcellulose, sodium cellulose acetate sulfate, sodium chondroitin sulfate or sodium carboxymethyl dextran.

28. The composition of claim 26 wherein the gelation agent is selected from the group consisting of degraded carrageenin, sodium salt of sulfated polygalacturonic acid methyl ester methyl glycoside, sodium lignosulfate, sodium dextran sulfate, and sodium carboxymethyl cellulose.

29. The composition of claim 26 wherein the gelation agent is degraded carrageenin.

30. The composition of claim 26 in the form of an aqueous suspension.

31. The composition of claim 26 in solid form.

32. The composition of claim 31 in the form of a compressed tablet.

33. The composition of claim 31 in the form of a powder.

References Cited

UNITED STATES PATENTS

| 2,833,690 | 5/1958 | Entrekin | 424—158 |
|---|---|---|---|
| 3,175,690 | 3/1965 | Anderson et al. | 424—158 |
| 3,236,735 | 2/1966 | Brown | 424—4 |
| 3,347,744 | 11/1967 | Latshaw | 424—362 |
| 3,364,111 | 1/1968 | Morii et al. | 424—127 |

(Other references on following page)

FOREIGN PATENTS

39/6955     1964    Japan.
1,098,980   1/1968   Great Britain _____ 424—158

OTHER REFERENCES

U.S. Dispensatory, Arthur Osol et al., J. B. Lippincott Co., Philadelphia, pp. 170, 171 and 464 (1955).

Encyclopedia of Chem. Tech. 2nd ed., John Wiley & Sons, Inc., pp. 631, 2, 645 and 646 (1963).

Chemical Abstracts, vol. 53 (1959) p. 15202i.

Chemical Abstracts, vol. 56 (1961) pp. 5000 and 5001.

Chemical Abstracts, vol. 64 (1964) p. 11023b.

ALBERT T. MEYERS, Primary Examiner

E. E. WADDELL, Assistant Examiner

U.S. Cl. X.R.

424—131, 155, 156, 157, 158, 180, 319

UNITED STATES PATENT OFFICE
CERTIFICATE OF CORRECTION

Patent No. 3,579,634　　　　　　　　　Dated May 18, 1971

Inventor(s) Garland Richard Brown

It is certified that error appears in the above-identified patent and that said Letters Patent are hereby corrected as shown below:

Column 2, line 22, "theemptying" should be --the emptying--.

Column 3, line 5, "antiacid" should be --antacid--.

Column 3, line 7, "pleaed" should be --placed--

Column 3, line 74, "salival" should be --saliva--.

Column 5, line 8, "gelatin" should be --gelation--.

Column 5, line 75, "adn" should be --and--.

Column 6, line 22, before "activity" insert --antacid--.

Column 7, line 28, "0.00008" should be --0.0008--.

Column 14, line 48, "gelatin" should be --gelation--.

Column 19, line 54, claim 25, "wihout" should be --without--.

Signed and sealed this 21st day of December 1971.

(SEAL)
Attest:

EDWARD M. FLETCHER, JR.　　　　　　ROBERT GOTTSCHALK
Attesting Officer　　　　　　　　　　Acting Commissioner of Patents